United States Patent [19]
Sako et al.

[11] 3,746,196
[45] July 17, 1973

[54] COATED PLASTIC CONTAINER FOR LIQUID MEDICINE

[75] Inventors: Eiji Sako, Osaka; Osamu Kawamura, Amagasaki, both of Japan

[73] Assignee: The Green Gross Corporation, Osaka, Japan

[22] Filed: Jan. 29, 1971

[21] Appl. No.: 111,135

Related U.S. Application Data

[63] Continuation of Ser. No. 694,425, Dec. 29, 1967, abandoned.

[52] U.S. Cl. ............. 215/1 C, 117/72, 117/76 F, 117/94, 117/95, 117/138.8 A, 117/138.8 F, 117/161 ZA
[51] Int. Cl. ............................................ B65d 23/00
[58] Field of Search ............... 117/95; 117/94, 95, 117/138.8 A, 138.8 F, 161 ZA, 72, 76 F; 215/1 C

[56] References Cited
UNITED STATES PATENTS

| | | | |
|---|---|---|---|
| 2,504,482 | 4/1950 | Goldman | 128/272 |
| 2,860,801 | 11/1958 | Nielsen | 117/94 |
| 3,197,332 | 7/1965 | Champ | 117/161 ZA |

*Primary Examiner*—Cameron K. Weiffenbach
*Attorney*—Christen & Sabol

[57] ABSTRACT

A polycarbonate container for an aqueous solution for medical use having a silicone resin layer on the inner surface and a layer of polyvinylidene chloride resin on the outer surface or a polycarbonate container having only a resin layer of polyvinylidene chloride resin on the outer surface. The container may be in bottle or bag form and is transparent, gas-impermeable, steam sterilization proof and does not release any detectable substances which impurify the medical solutions.

4 Claims, No Drawings

COATED PLASTIC CONTAINER FOR LIQUID MEDICINE

CROSS REFERENCE TO RELATED APPLICATION

This application is a continuation of application Ser. No. 694,425 filed Dec. 29, 1967 and now abandoned.

BACKGROUND OF THE INVENTION

1. Field of the Invention

This invention relates to a container for an aqueous solution for oral administration and injection and more particularly to a plastic or synthetic resin container for solutions which withstands steam sterilization and does not deteriorate or impurify the solution even if the solution is therein stored for a long period of time.

2. Description of the Prior Art

Generally, a container for liquid medicines for oral administration and injection has been made of glass. Further, various attempts have been made to make a plastic container for liquid medicines which possesses various advantages of a glass container, and does not possess such disadvantages and inconveniences of a glass container as fragility, heaviness and sometimes impurification of the liquid medicine due to the release of a small amount of alkaline components. However, an ideal or nearly ideal transparent plastic container, which is proof against steam sterilization and never impurifies or deteriorates the liquid medicine due to the release of the components from the plastic container or due to gas permeation through the container when the liquid medicine is stored therein for a long period of time, has never been realized yet.

SUMMARY OF THE INVENTION

In the present invention, these problems inherent to the use of plastics have been almost completely solved. The present invention is to provide a polycarbonate container for liquid medicines in bottle or bag form, which has a silicone resin layer on the inner surface and a layer consisting mainly of polyvinylidene chloride resin on the outer surface of the container.

The present inventor started his study with selecting such a plastic material that any harmful components would not be released into the liquid medicine from the plastic container, as follows.

The present inventor prepared a number of bottle-type containers made of various kinds of plastics, such as low density polyethylene, high density polyethylene, polypropylene, polystyrene, polycarbonate, rigid polyvinyl chloride, acrylonitrile-styrene polymer and acrylonitrile-butadiene-styrene polymer, filled each container with distilled water for injection up to 50 percent of the container volume, sealed with a plug, placed in an autoclave, and heated under pressure for 20 minutes with saturated steam at 121° C. High density polyethylene, rigid polyvinyl chloride, polystyrene, acrylonitrile-styrene polymer, and acrylonitrile-butadiene-styrene polymer containers were melted or softened, and were found to be inappropriate. Change in the quality of the solution contained therein, that is, the presence of extractable (releasable) substances from the containers was examined. Comparison of the test results on plastic containers with those on a hard glass and a soft glass container is shown in Table 1. In Table 1 it is indicated that the low density polyethylene container is not appropriate because of the considerable change in quality of the solution, while the solution in the polycarbonate container is not inferior to that in the hard glass container, and the change in quality of the solution in the polypropylene container is much the same as that in the hard glass container.

TABLE 1

[Change in the quality of solution in the containers due to autoclaving at 121° C. for 20 minutes by saturated steam under high pressure]

| Container | | | Change in quality of liquid (tests for extractable substances) | | | | | | | |
|---|---|---|---|---|---|---|---|---|---|---|
| Material | Average degree of polymerization | Taste and Smell | pH increase | Heavy metals (as Pb) | Chlorides | Sulphates | Potassium permanganate (0.01 N) required, ml. | Ammonia nitrogen, ml. | Phenol | Formaldehyde |
| Low density polyethylene. | 2,000 | Bitter | +0.4 | 0.2 γ/ml | 0.2 γ/ml | 2.5 γ/ml | 1.0–4.0 | 0.5–1.8γ | Not detected. | Not detected. |
| Polycarbonate. | { 110<br>{ 140 | Normal<br>do | +0.1<br>+0.1 | Not detected<br>do | Not detected<br>do | Not detected<br>do | 0.4<br>0.5 | 0.4 γ<br>0.4 γ | do.<br>do. | Do.<br>Do. |
| Polypropylene. | 12,000 | Normal | +0.2 | do | do | do | 0.7 | 0.6 γ | do | Do. |
| Hard glass | | do | +0.2 | do | do | do | 0.5 | 0.4 γ | do | Do. |
| Soft glass | | do | +2.5 | do | do | do | 0.5 | 0.4 γ | do | Do. |

Tests for these extractable substances were conducted on the solution in the containers before and after sterilization as test solutions according to the following procedures. As to pH, sodium chloride was added to the solution in the proportion of 0.005 percent, and the difference between pH values before and after the sterilization was measured. Heavy metals, chlorides, sulfates, and ammonia nitrogen were quantitatively determined according to the conventional colorimetric method or turbidimetric method and the contents of these substances were expressed in mcg. per 1 ml. of the test solution. Amount of potassium permanganate required was expressed in the number of ml. of a 0.01 N potassium permanganate solution consumed by 20 ml. of the test solution. Phenol was detected by the presence of the precipitate brought about with the bromine reagent solution, and formaldehyde was detected by the color developed by the acetylacetone test. These tests were conducted at the same time on the distilled water for injection as the control. It was found from these test results that polycarbonate and polypropylene were suitable for the materials for plastic containers capable of competing with hard glass, because they were proof against steam sterilization and did not impurify the liquids contained. However, it was found that polypropylene had some problems in transparency when it was used as a container for solutions.

The plastics generally have some gas permeability. When a aqueous solution is stored in a plastic container for a long period of time, a number of gases, such as carbon dioxide, water vapor, etc., permeate into or from the container, thus causing deterioration of the solution, contained therein. Particularly, the thinner the wall of the container is the more such gas permeability impedes the practical use of the plastic container. Thus, so long as some measure is not taken to the outer container or the package, or a considerably thick wall container is not prepared in disregard of economy, there still exists a problem in using a plastic container for solutions for injection.

In order to find out a coating material which can satisfactorily shut out the gas permeability of polycarbonate, the inventor tried to coat the outer surface of the polycarbonate container with a coating liquid containing silicone resin, polyurethane resin, polyacrylonitrile resin, epoxy resin or polyvinylidene chloride resin and tested the carbon dioxide gas permeability of the coated polycarbonate containers. The coating liquid of polyvinylidene chloride resin showed good results, and other coating liquids were found in appropriate. Then, the inventor selected a silicone resin as a coating material which can shut out the water permeability of polycarbonate, and tested the gas permeability and the water permeability of polycarbonate in combination with polyvinylidene chloride resin and compared these results with those obtained with polycarbonate whose inner surface or outer surface was singly coated with silicone resin or polyvinylidene chloride resin. Further, the inventor prepared containers of hard glass and other plastics and tested the permeabilities of the non-coated containers for reference purpose.

The carbon dioxide gas permeability test was conducted in the following manner. Aqueous solution of sodium bicarbonate, which contains about 1 mc (milicurie) of radioactive carbon ($^{14}C$) and non-radioactive sodium bicarbonate, and required amount of hydrochloric acid were placed in a container so that both solutions may not contact with each other. After the container was tightly stoppered with a plug, both solutions were mixed to generate radioactive carbon dioxide gas in the container. The radioactive carbon dioxide gas permeating through the container wall was completely captured with aqueous potassium hydroxide solution, and the radioactivity was measured after two weeks. The amount of radioactive carbon dioxide gas (cpm/cm$^2$ of the container surface) which had permeated through the container wall for two weeks was measured. The water permeability test was conducted according to the method based on JIS Z-0221 where the test film was loaded with the indicator (mixture of dried methyl violet and sucrose), which was covered with a watch glass and sealed with paraffin, and when the film was floated on water, the methyl violet in the indicator would change its colour from white to violet due to the permeation of water through the film. The time required for the water permeation was measured on the polycarbonate films coated with coating materials.

The test results for the carbon dioxide gas permeability are shown in Table 2.

Remark: The hard glass container having a wall thickness of about 300$\mu$ was not available, and thus that with 3000$\mu$ was used.

The results of the water permeability test are shown in the following Table 3.

TABLE 2

[Test temperature: 32° C.]

| Container | | | Carbon dioxide gas permeability (c.p.m./cm.$^2$) |
|---|---|---|---|
| Material | Wall thickness ($\mu$) | Coating material | |
| Polycarbonate | 300 | Inner surface, silicone; Outer surface, polyvinylidene chloride. | 534 |
| | 300 | Inner surface, silicone; Outer surface, none. | 3,986 |
| | 300 | Inner surface, none; Outer surface, polyvinylidene chloride. | 554 |
| | 300 | None | 5,208 |
| Non-rigid polyvinyl chloride. | 450 | do | 8,965 |
| Polypropylene | 850 | do | 3,351 |
| Hard glass | 3,000 | do | 5 |

TABLE 3

[Test water temperature: 20±1° C.]

| Test film | | | | Time required for water permeation (min.) |
|---|---|---|---|---|
| Material | Thickness ($\mu$) | Coating material | Water contact | |
| Polycarbonate | 55 | Silicone | Silicone | 15 |
| | 55 | Polyvinylidene chloride. | Polycarbonate | 2,000 |
| | 55 | Silicone on one side, and polyvinylidene chloride on other side. | Silicone | 2,800 |
| | 55 | None | Polycarbonate | 8 |
| Low density polyethylene. | 55 | do | Low density polyethylene. | 38 |
| Non-rigid polyvinyl chloride. | 450 | do | Non-rigid polyvinyl chloride. | 98 |

DESCRIPTION OF THE PREFERRED EMBODIMENTS

It was found from these test results that the polycarbonate container whose inner surface was coated with silicone resin and whose outer surface was coated with polyvinylidene chloride resin could satisfactorily shut out the gas permeability and water permeability of the container wall. Coating with polyvinylidene chloride resin may be conducted either before or after the sterilization of the container.

The disadvantage of plastics is the tendency toward becoming soft when heated, as compared with glass. When a plastics container becomes soft, the container expands and is finally broken due to the pressure difference between the interior and the exterior of the container. It is natural that such a tendency is remarkable particularly when a thin wall container is used. Further, the plastic container encounters a great trouble, when sterilized with steam, as shown below:

A plastic container is filled with aqueous solution, tightly sealed and placed in an autoclave to heat the container under pressure with saturated steam for sterilization. Even if the autoclave is opened to the atmosphere after the sterilization, the solution in the container is retained at a temperature higher than 100° C., and thus the internal pressure of the container is higher than the atmospheric pressure.

When the cooling is conducted without opening the autoclave, there also arises a pressure difference between the interior and the exterior of the container. Accordingly, in case of the thin wall container, the container expands and breaks.

In order to solve such a problem in using the present container for liquid medicines, the inventor prepared a wire-mesh or a perforated metal plate sheath which can fit in with the outer wall of the container and provided each container with the sheath one by one, and placed the sheathed container in an autoclave, thereby preventing the container wall from expansion and breakage on cooling. In this way, the inventor succeeded in utilizing a plastic container with the thin wall as a light and disposable container for solution. Further, when the container is provided with a metallic sheath, the container is not broken, even if the container is cooled rapidly by sprinkling ordinary temperature water from the high temperature just after the sterilization in an autoclave. In this way, the treatment after the heating for sterilization can be rapidly carried out.

In place of the foregoing method, the following sterilization method can be also applied for the same purpose and effect. That is, the autoclave is provided with a conduit which connects the autoclave to an air tank holding air compressed under the pressure of 15 pounds/square inch. When sterilization is finished with saturated steam under pressure, the said compressed air is introduced into the autoclave to prevent a pressure decrease due to cooling by sprinkling water of the ordinary temperature just after the heating in the autoclave by supplementing the said decrease of the pressure with the compressed air. After the container is sufficiently cooled, the autoclave is subjected to the pressure reduction. By employing such a sterilization method, a plastic container particularly polycarbonate container, with the thin wall and disposable because of its low cost, can be utilized as a container for solutions for the medical use. Such a container is lighter and more unbreakable than a conventional glass container, and thus very useful in the pharmaceutical fields.

The method for preparing the present polycarbonate container for liquid medicines and the utility of the container thus prepared are concretely explained below with reference to examples.

EXAMPLE 1

A 600 ml bottle-type container having a side wall thickness of 300 $\mu$, which had been prepared by blowing polycarbonate having an average bisphenol A polymerization degree of 110, was filled with 0.05 percent silicone resin prepared from Siliclad (Registered Trade Mark) (CLAY-ADAMS Inc., U.S.A.), left for 10 minutes, and dried for 10 minutes at 100° C. after the silicone was removed. Such operation was repeated five times. After that said container was dipped in a latex of Krehalon DOA (Registered Trade Mark) (Kreha Chemical Co., Japan) containing about 55 percent concentration of an emulsion copolymer consisting essentially of about 90 percent by weight vinylidene chloride, resin and about 10 percent by weight acrylic resin. and lifted up. Excess latex was left to trickle. Then, the container was dried at room temperature. Care was taken so that the latex might not enter the container when the container was dipped in the latex.

The thickness of the silicone layer on the container thus coated was about 5 $\mu$, and the thickness of the polyvinylidene chloride resin layer was about 30 $\mu$.

This container was filled with 500 ml of normal saline solution, stoppered lightly with a rubber plug and sealed with an aluminum cap. The container was placed in an autoclave and heated under pressure with saturated steam at 121° C. for 20 minutes for sterilization. Just after sterilization, the ordinary temperature water was sprinkled into the autoclave and the container was cooled down to the ordinary temperature, and then taken out of the autoclave.

In order to prevent the deformation of the container when cooled, the container had been equipped with a wire mesh sheath prior to sterilization. In another case, the compressed air under the same pressure as a maximum internal pressure in the autoclave was introduced into the autoclave when cooling.

The container thus taken out kept the original shape, and the solution in the container was also free from bacteria.

EXAMPLE 2

An aqueous solution (pH 6.5) containing ions of sodium (131 mEq/L), potassium (4 mEq/L), Calcium (3 mEq/L), Chloride (110 mEq/L) and Lactate (28 mEq/L) was poured in the container prepared in Example 1 up to 80 percent of the container volume, and the opening part was sealed with a stopper. In the same way as in Example 1, steam sterilization was conducted at 121° C. under pressure for 20 minutes. When cooling, the compressed air was introduced into the autoclave. The resulting container was left for 2 years at 32° C., and then the change in quality of the content, vapor dissipation, etc. were examined. The result is shown in the following Table 4.

EXAMPLE 3

The same aqueous solution as in Example 2 is poured in the polycarbonate container, which was of the same type, size, thickness and polymerization degree as the container in Example 2.

After the filling, the container is sealed with a plug and coated with a latex of Krehalon VOA only on the outersurface of the container and sterilized in the same way as in Example 2.

The resulting container was left for 2 years at 32° C., and then the change in quality of the contents were examined. The test result is shown in the Table 4. The Table 4 shows that the almost same results could be attained with both of the contents in the containers described in Examples 2 and 3 as with the hard glass container.

TABLE 4

| | Change in the quality of the content | | |
|---|---|---|---|
| Container | Coloring | Precipitation | Reduction in volume |
| Polycarbonate container without surface coating (wall thickness: 300$\mu$). | Became brownish yellow | Precipitation was appeared. | About 50%. |
| Polycarbonate container prepared in Example 2 (wall thickness: 335$\mu$). | Colourless | Not appeared. | About 5%. |
| Polycarbonate container prepared in Example 3 (wall thickness: 332$\mu$). | do | do | Do. |
| Rigid glass container (wall thickness: 4,000$\mu$). | do | do | No reduction. |

According to the present invention, the gas permeability and the water permeability of a polycarbonate container can be shut out with good results, and thus, a plastic container very thin in its wall thickness and disposable because of its low cost can be utilized as a container for liquid medicines for medical use. Such a container is lighter and more unbreakable than the conventional glass container, and thus very useful in the pharmaceutical fields.

What is claimed is:

1. A container for solutions for medical use which comprises a body of polycarbonate coated on the outer surface with a layer consisting of a member selected from the group consisting of polyvinylidene chloride and an emulsion copolymer consisting essentially of about 90 percent by weight vinylidene chloride and about 10 percent by weight acrylic resin.

2. The container according to claim 1 wherein the container body is a member selected from the group consisting of a bottle and a bag.

3. The container according to claim 1 wherein the polycarbonate body is coated on the inner surface with a layer of silicone resin.

4. The container according to claim 3 wherein the container body is a member selected from the group consisting of a bottle and a bag.

* * * * *